US009279693B2

(12) United States Patent
Hymel et al.

(10) Patent No.: US 9,279,693 B2
(45) Date of Patent: Mar. 8, 2016

(54) NAVIGATION SYSTEM AND METHOD FOR DETERMINING A ROUTE BASED ON SUN POSITION AND WEATHER

(75) Inventors: James Allen Hymel, Kitchener (CA); William Donald Santo, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 332 days.

(21) Appl. No.: 13/399,005

(22) Filed: Feb. 17, 2012

(65) Prior Publication Data

US 2013/0218449 A1 Aug. 22, 2013

(51) Int. Cl.
*G01C 21/00* (2006.01)
*G01C 21/34* (2006.01)
*G01C 21/36* (2006.01)

(52) U.S. Cl.
CPC ........ *G01C 21/3461* (2013.01); *G01C 21/3647* (2013.01)

(58) Field of Classification Search
CPC ................................ G01C 21/34; G01C 21/00
USPC .................... 701/410, 411, 412, 415
See application file for complete search history.

(56) References Cited

U.S. PATENT DOCUMENTS

| | | | |
|---|---|---|---|
| 6,256,666 B1 | 7/2001 | Singhal | |
| 6,304,816 B1 * | 10/2001 | Berstis | 701/117 |
| 6,438,585 B2 | 8/2002 | Mousseau et al. | |
| 6,505,237 B2 | 1/2003 | Beyda et al. | |
| 7,475,120 B1 | 1/2009 | Ngo et al. | |
| 8,009,650 B2 | 8/2011 | Rybak et al. | |
| 2002/0082771 A1* | 6/2002 | Anderson | 701/209 |
| 2002/0128773 A1 | 9/2002 | Chowanic | |
| 2004/0098175 A1 | 5/2004 | Said | |
| 2004/0252193 A1* | 12/2004 | Higgins | 348/149 |
| 2006/0271286 A1 | 11/2006 | Rosenberg | |
| 2008/0004802 A1* | 1/2008 | Horvitz | 701/209 |
| 2009/0043865 A1 | 2/2009 | Dumitru et al. | |
| 2011/0060523 A1 | 3/2011 | Baron | |
| 2011/0220091 A1* | 9/2011 | Kroyzer | 126/572 |
| 2011/0234626 A1* | 9/2011 | Seong et al. | 345/619 |
| 2012/0035887 A1* | 2/2012 | Augenbraun et al. | 703/1 |

FOREIGN PATENT DOCUMENTS

| | | |
|---|---|---|
| DE | 10 2008 043455 A1 | 5/2010 |
| EP | 1 746 389 A1 | 1/2007 |
| JP | 8 159800 A | 6/1996 |

(Continued)

OTHER PUBLICATIONS

B. Auffray, Impact of Adverse Weather on Traffic Conditions on an American Highway: Effect of the Sun Glare on Traffic Flow Quality, Spring 2007.*

(Continued)

*Primary Examiner* — Calvin Cheung
*Assistant Examiner* — Martin Weeks
(74) *Attorney, Agent, or Firm* — Moffat & Co.

(57) ABSTRACT

A method for a computing device to determine a route entails determining a sun position relative to the route, determining weather conditions along the route, and determining whether to provide alternate routing based on both the sun position and the weather conditions. In one implementation, time-specific and weather-specific digital photographs of points of interest along the route are downloaded for display on the device when the device is located at or near the points of interest.

18 Claims, 9 Drawing Sheets

(56) References Cited

FOREIGN PATENT DOCUMENTS

WO 2010 040386 A1 4/2010
WO 2010040386 A1 4/2010

OTHER PUBLICATIONS

Extended European Search Report dated Jul. 23, 2012 from corresponding European Patent Application No. 12155922.3.

* cited by examiner

NAVIGATION SYSTEM AND METHOD FOR DETERMINING A ROUTE BASED ON SUN POSITION AND WEATHER

CROSS-REFERENCE TO RELATED APPLICATIONS

This is the first application filed for the present technology.

TECHNICAL FIELD

The present technology relates generally to computing devices and, in particular, to navigation systems that use a positioning system and roadmaps to provide routing directions to a destination.

BACKGROUND

Navigation systems use a global navigation satellite system (GNSS) such as the Global Positioning System (GPS) in conjunction with roadmap data to provide visual and audible directions from a starting point to a destination location. Occasionally, the navigation system will direct the user along a route that aligns with the rising or setting sun which is generally unpleasant and sometimes even dangerous for the driver. Furthermore, such routes frequently become congested because drivers must exercise extra caution. In such cases, it may be desirable to take a detour or alternate route to avoid driving straight at the rising or setting sun.

PCT Patent Application Publication WO 2010/040386 A1 discloses a navigation system that determines a route between two locations and then computes whether the rising or setting sun would be aimed directly at the driver traveling the route. Re-routing is then performed or proposed based on this determination. However, in some cases, this technology will re-route the user unnecessarily. Therefore, an improvement on this technology is highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
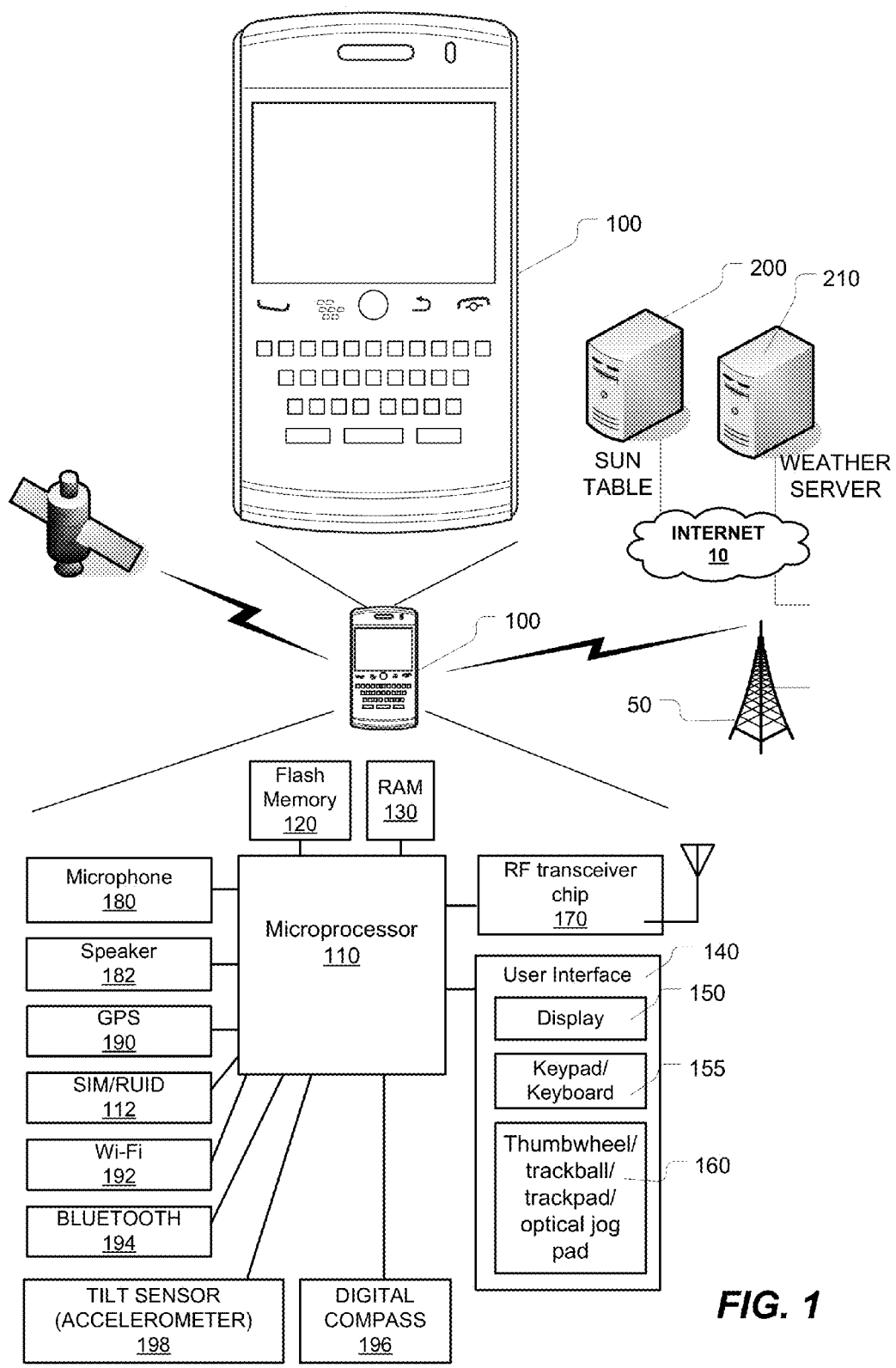
FIG. 1 is a depiction of a mobile device on which the present technology may be implemented, the depiction including a schematic depiction of some components of the mobile device.

The present technology provides an improved navigation system and method that determines a route to a destination location by taking into account a position of the sun relative to the direction of travel along the route as well as the weather conditions along the route. The navigation system determines whether the user's visibility along this route will be impaired or otherwise adversely affected by a rising or setting sun that is substantially aligned with at least a portion of the route. The navigation system also determines whether the current weather conditions (e.g. cloudiness) along that route would mitigate the visibility-curtailing effect of the sun-route alignment. Accordingly, an alternate route is determined based on both a position of the sun relative to the route and the weather conditions. If the weather conditions are clear and sunny and the route aligns with the sun, an alternate route is provided or proposed to avoid driving toward the sun. If the weather conditions are cloudy, the navigation system will maintain the originally selected or computed route even if the route aligns with the sun.

Accordingly, one aspect of the present technology is a method for a computing device to determine a route. The method entails determining a sun position relative to the route, determining weather conditions along the route, and determining whether to provide alternate routing based on both the sun position and the weather conditions.

Another aspect of the present technology is a computer-readable medium comprising instructions in code which when loaded into a memory and executed by a processor of a computing device cause the computing device to determine a sun position relative to the route, determine weather conditions along the route, and determine whether to provide alternate routing based on both the sun position and the weather conditions.

Another aspect of the present technology is a computing device such as a navigation-capable mobile device having a position-determining subsystem for determining a current position of the computing device, a user input device for receiving a destination location, a processor operatively coupled to a memory to execute a navigation application for determining a route to the destination location in response to user input received via the user input device, the navigation application determining a sun position relative to the route based on the current position, a current date, and a time of day, and a radiofrequency transceiver for obtaining weather conditions along the route. The navigation application executed by the processor determines whether to provide alternate routing based on both the sun position and the weather conditions.

The details and particulars of these aspects of the technology will now be described below, by way of example, with reference to the drawings.

By way of overview, the present technology enables a navigation system to determine a route that will avoid or minimize driving in a direction that aligns with the rising or setting sun when weather conditions are such that the sun is visible. By obtaining weather conditions for the route, the navigation system may determine whether a route that aligns with the rising or setting sun would be problematic. If the weather conditions are sunny, then the navigation system provides alternate routing (either by automatically recalculating an alternate route that avoids the sun or by proposing the alternate route to the user). If the weather conditions are cloudy, then the originally computed route (e.g. as computed using a shortest path or quickest path algorithm) is maintained as the route to be displayed since the sun will not impair the driver's vision.

FIG. 1 is a depiction of a mobile device as one example of a computing device. The computing device may also be referred to herein as a navigation device, navigation-capable device or navigation-enabled device. This computing device, which is generally designated by reference numeral 100, includes a processor (or microprocessor) 110 and memory 120, 130 for executing one or more applications. The memory may include flash memory 120 and/or random access memory (RAM) 130. Other types or forms of memory may be substituted or used.

As depicted by way of example in FIG. 1, the computing device 100 includes a user interface 140 for interacting with the computing device and any applications running on the device, such as, for example, a navigation application. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the computing device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the computing device 100 is a wireless communications device or mobile device, the device may include a Subscriber Identity Module (SIM) card 112 for GSM-type devices or a Re-Usable Identification Module (RUIM) card for CDMA-type devices. The RF transceiver 170 may include separate voice and data channels.

The computing device 100 optionally includes a speech-recognition subsystem that for transforming voice input received by a microphone 180 in the form of sound waves into an electrical signal. The electrical signal is then processed by a speech-recognition module (digital signal processor) to determine keywords or phrases from the voice input. Optionally, the computing device 100 may include a speaker 182 and/or an earphone jack.

Optionally, the computing device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the computing device may include other sensors like a digital compass 196 and/or a tilt sensor or accelerometer 198.

As noted above, a mobile device or wireless communications device is one example of a computing device 100 on which the present technology may be implemented. Other computing devices 100 may include GPS navigation units, laptops, palmtops, notebooks, tablets, or any other portable navigation-capable devices.

To implement this novel technology, the memory 120, 130 of the computing device 100 depicted by way of example in FIG. 1 stores a navigation application with map data (or roadmap data) for one or more geographical regions (e.g. Europe, North America). The processor 110, which is operatively coupled to the memory 120, 130, executes a navigation application to provide routing (i.e. navigational instructions or directions) between a starting point (or a current location) and a destination location. In main implementations, a GNSS (global navigation satellite system) such as the Global Positioning System (GPS) provides signals from which the computing device determines its current position. As depicted in FIG. 1, the device 100 includes a GPS chipset 190 (or other position-determining subsystem) to determine the current location of the device. The GPS coordinates are relayed to the navigation application to provide real-time navigation.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

References herein to "GPS" are meant to include Assisted GPS and Aided GPS.

Another sort of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

Other location-determining subsystems such as a WPS (Wi-Fi Positioning System) may also be used to provide more granular location data. In some embodiments, it may be sufficient to determine in what country the device is operating. In other embodiments, greater precision may be necessary. These other location-determining subsystem may involve, for example, techniques based on the identity of the closest base station tower or techniques involving obtaining information stored in a home location register (HLR) or visitor location register (VLR).

As depicted by way of example in FIG. 1, the navigation-enabled device 100 obtains sun position data from a sun position database stored on a sun data server 200 and obtains, either concurrently or sequentially, the weather conditions (that is, weather data representing the weather conditions)

from a weather server 210. Alternatively, the sun position data may be stored locally on the device. Weather data, on the other hand, is stochastic by its very nature and thus must be obtained from the weather server 210 or from any other weather service.

Weather data may be received for the entire route in a single initial transmission of data packets when the route is first determined. Alternatively, the weather data may be received in a series of successive transmissions at discrete locations along the route as the device traverses the route. In one example implementation, the device may be configured to divide the route into a predetermined number of segments (or a variable number of segments of a fixed length) for which weather data is to be separately obtained as the device approaches each successive segment of the route. For example, a 100-mile (160 km) route may be divided into four segments of 25 miles (40 km). The device may be configured, for example, to request weather data at the start of the journey and subsequently when the device is within 1 mile (1.6 km) of each subsequent segment of the route.

In another implementation, the device may have a user-configurable setting or parameter that determines how frequently weather data should be obtained or how stale the weather data may be before it must be refreshed or updated. For example, the device may specify that weather data no more than twenty minutes old may be used, thus requiring the device to obtain updated weather every twenty minutes.

As noted above, obtaining weather conditions along the route may be done for the entire route or it may be done for only a first portion or segment of the route. Predicting weather conditions for the entire route at the outset of the journey is important where the route has no possible detours or very few detours. On the other hand, if the route contains many possible detours along the route, the device need not download weather condition data for the entire route because alternate routes may be computed based on weather updates received while the device is traveling along the route. Thus, the determination of weather data may be based on the number of connecting roads that connect the route to the destination, i.e. the amount of possible detours that may be taken from the current route to the destination.

The sun position data stored on sun data server 200 includes sunrise and sunset data for various positions on earth. Alternatively, a formula, equation, algorithm, iterative calculation, or the like may be used to compute the sunrise time and/or the sunset time based on the coordinates and the date and the time of day. The sunrise and sunset data, whether obtained from a simple lookup table or computed mathematically, is then compared by the device 100 to the current location of the device and its current heading (i.e. bearing or travel direction) to determine whether the sun will be aligned with the driving direction for all or a portion of the route.

In one implementation, the device may specify a minimal amount of the route that must align with the sun for the navigation application to seek an alternate route. Accordingly, if the sun aligns with the road over only 1.6 km (1 mile) of a 160 km (100 mile) route, this may be considered too minimal to warrant re-routing.

In one implementation, the degree of sun-road alignment must be within a predetermined (and optionally user-reconfigurable) angular tolerance for the navigation application to seek an alternate route. For example, the navigation application will only re-route the device if the sun-road alignment is within an angular tolerance of +/−5 degrees or +/−10 degrees.

Figure 2:
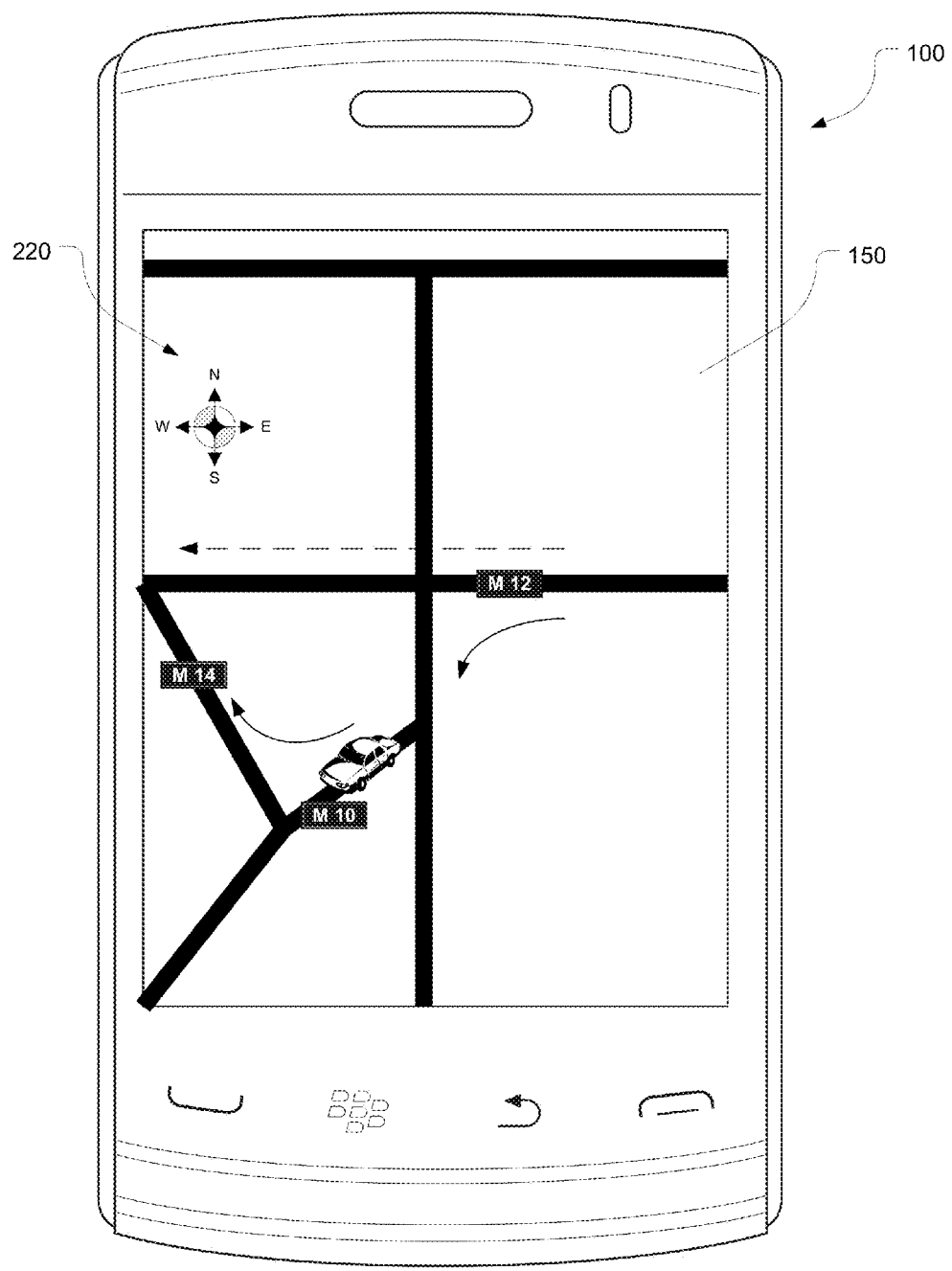
FIG. 2 is a depiction of a navigation application executing on a mobile device in accordance with one implementation of the present technology.

FIG. 2 depicts an example of a navigation application executing on a mobile device or computing device 100. The device displays a map or roadmap 220 on a display screen 150 of the device 100. In this example scenario, the device (whose position is represented graphically by a graphical current position indicator in the form of a car icon) has been travelling west along a roadway labelled as M12. In this example, it is assumed that it is late afternoon and the sun is setting due west. A driver heading west along M12 will thus have the sun directly in her eyes, Weather conditions along the M12 and toward the western horizon as seen from the M12 are clear (blue skies) and thus the sun will be shining into the eyes of the driver. When the navigation application has determined a route, the device 100 intelligently recognizes (by determining the position of the sun at these GPS coordinates) that the westbound route along M12 is aligned with the setting sun at this position on Earth (i.e. based on the latitude, day of the year, and time of day). The device has also recognized that there is no cloud cover to block the sun, so the driver's vision is likely impaired by the setting sun. Accordingly, the device 100 determines an alternate route for the driver. The device 100 re-routes the driver onto M10 and M14 so as to avoid driving directly into the sun.

It should be appreciated that the route may be programmed by specifying a destination location or, alternatively, the route may be predicted based on a direction of travel or based on historical usage patterns.

Figure 3:
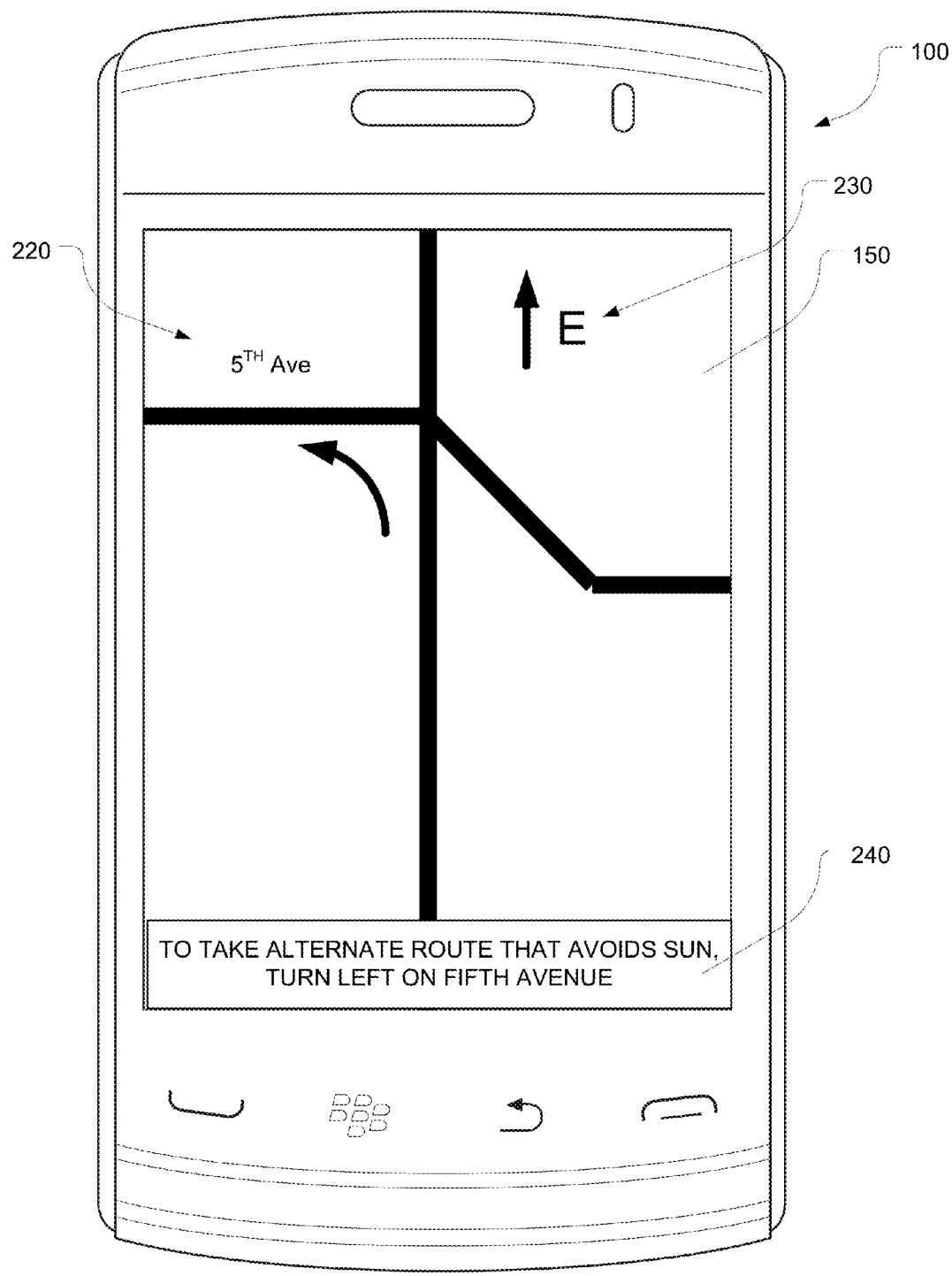
FIG. 3 depicts the navigation application re-routing the device onto an alternate route to avoid the rising sun.

FIG. 3 depicts another example scenario in which the navigation application presents navigation instructions or directions to the user. These directions may be visual (e.g. textual directions 240 appearing along the bottom of the screen 150 or elsewhere) and/or audible directions (e.g. using a text-to-speech module). In this example, presented solely to illustrate one particular implementation, the device is heading eastbound early in the morning. The heading may be represented onscreen by a virtual compass 230, which may include, as shown, an arrow and a bearing (e.g. E for East, W for West, etc.). Based on the current position fix (e.g. GPS coordinates of latitude and longitude), the device 100 determines that the user (driver) is heading directly into the rising sun. The device then notifies the user (visually and/or audibly) to take an alternate route that avoids the sun by, for example, turning left (north) on Fifth Avenue. The notification 240 in this example includes text along the bottom of the screen 150. In this example, this text reads: "To take alternate route that avoids sun, turn left on Fifth Avenue". This is merely an example. Any other suitable wording or language may be used. A directional arrow may optionally be displayed onscreen to further guide the user/driver.

Figure 4:
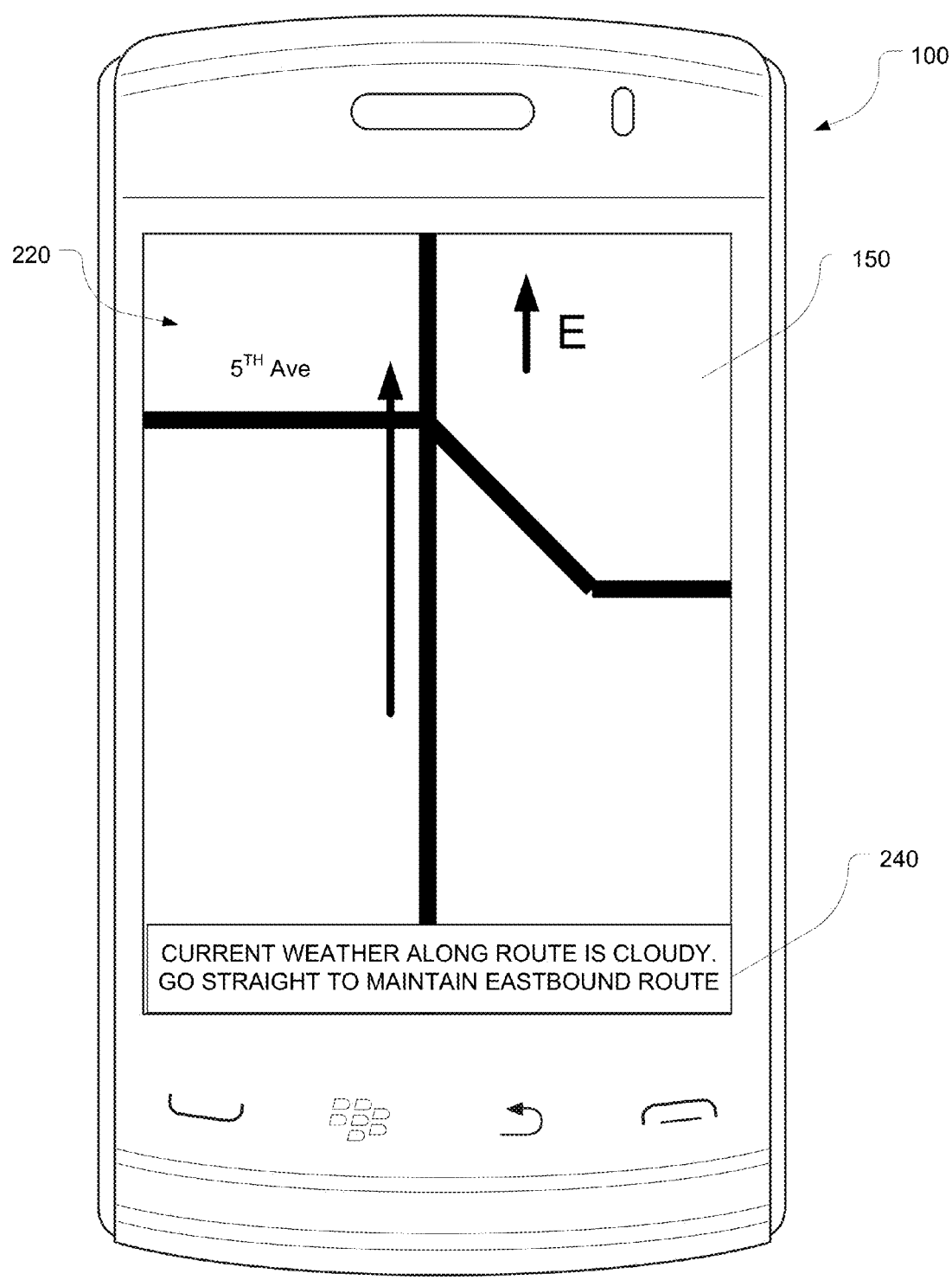
FIG. 4 depicts the navigation application notifying the user that he or she may continue to maintain the original routing because the weather is cloudy along the route.

FIG. 4 depicts another example scenario in which the navigation application executing on the device notifies the user/driver that there is sufficient cloud cover ahead to enable the user/driver to maintain his or her eastbound course without encountering the sun. A visual (textual) notification 240 may be displayed to notify the user.

In one implementation, the device may also take into consideration any natural geographical features (e.g. mountains, hills, ridges, canyons, etc.) or any manmade structures (e.g. buildings, tunnels, etc.) that may block the sun at the current position, thus enabling the user to continue driving toward the sun despite the fact that there is no cloud cover.

In one implementation, the device audibly recommends or proposes an alternate route. This may, in one example, require the user to accept the alternate route. In another example, this alternate route is adopted unless the user overrides the alternate route. The alternate route proposed by the navigation application may be overridden by a voice command spoken by the user or by touch input on the screen on the device. The user may also simply ignore the re-routing and continue along the originally computed route. The device will recognize this deviation and will announce that it is re-calculating the route. However, the device may be programmed to recognize this deliberate ignoring of the alternate route as a user override command, in which case the alternate route is not re-calculated and the device may inform the user that the navigation application is reverting to the original route.

In another implementation, a luminosity sensor (light sensor) on the device or mounted to the vehicle (and in communication with the device) may be used to determine whether the device is aimed at the sun although this requires that the device be mounted with a proper orientation and in a position that enables the sensors to read the ambient luminosity.

Another aspect of the present technology entails displaying photographs of locations or points of interest along the route to enhance the navigation experience for the user. The photographs may be obtained and displayed for the originally calculated route or for the alternate route. The photographs are time-specific and weather-specific. When the device determines the weather for the route, this weather data may be used to request weather-specific photographs that will reflect the actual images that the user will see in the current weather conditions (e.g. sunny, cloudy, snowing, raining, etc.) The weather-specific photographs are furthermore time-specific (both for a time of day and a time of year). These time- and weather-specific photographs thus enhance the navigational experience.

Figure 5:
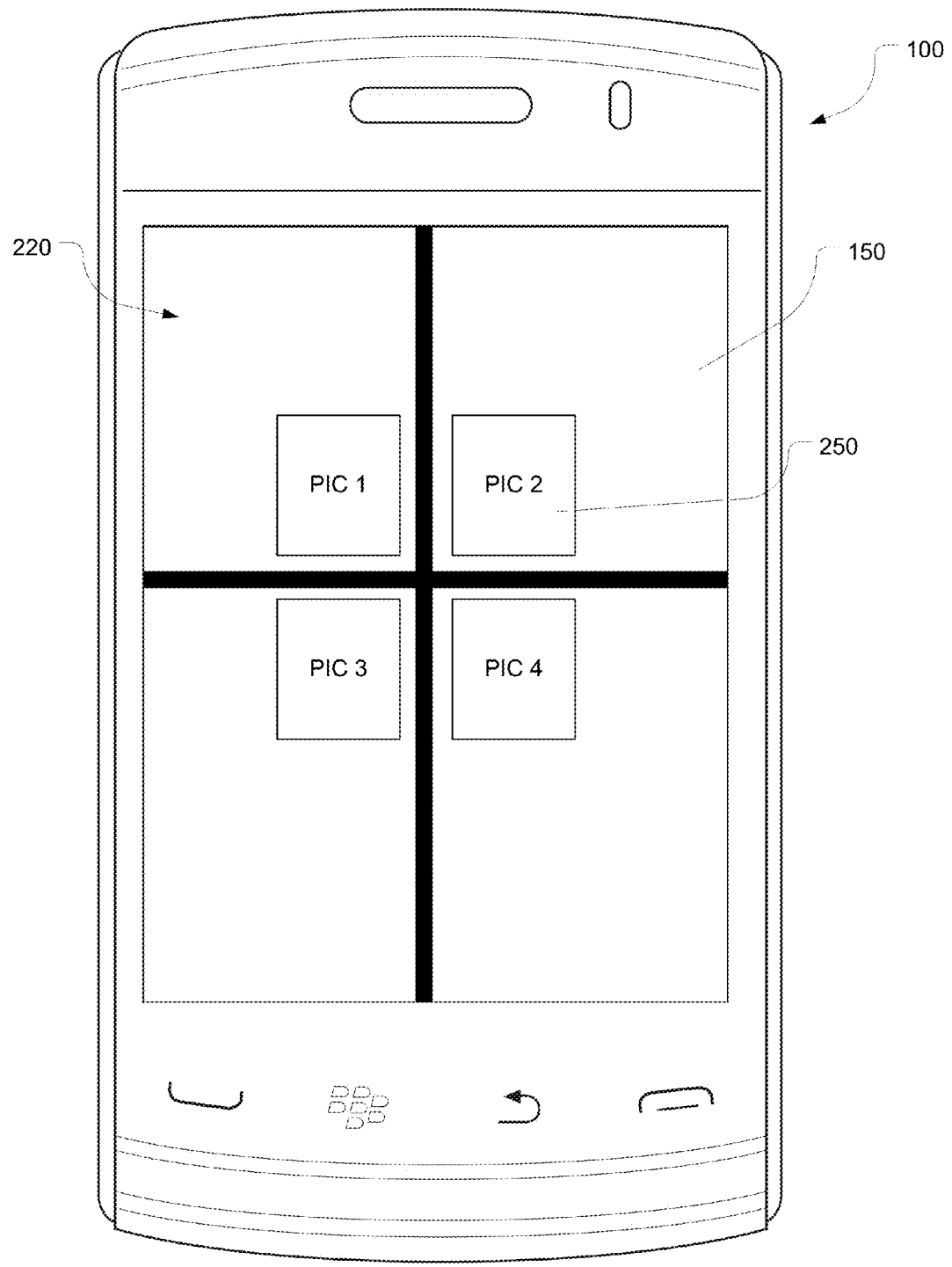
FIG. 5 is a depiction of a mobile device showing thumbnail images of time-specific and weather-specific photographs of a points of interest at an intersection along the route.

FIG. 5 depicts a navigation application that displays time-specific and weather-specific digital photographs 250 in conjunction with the map 220 in accordance with another aspect of the present technology. These photographs may be displayed at an intersection (as depicted in the figure) or at any POI or any other locale along the route. The photographs may be thumbnail images that may be individually expanded in response to touching or clicking the thumbnail images, in response to voice commands, or in response to any other user input. Four images (labelled Pic1, Pic 2, Pic 3 and Pic4) are shown by way of example in this figure, although it will be appreciate that the number and placement are strictly for the sake of illustration.

Figure 6:
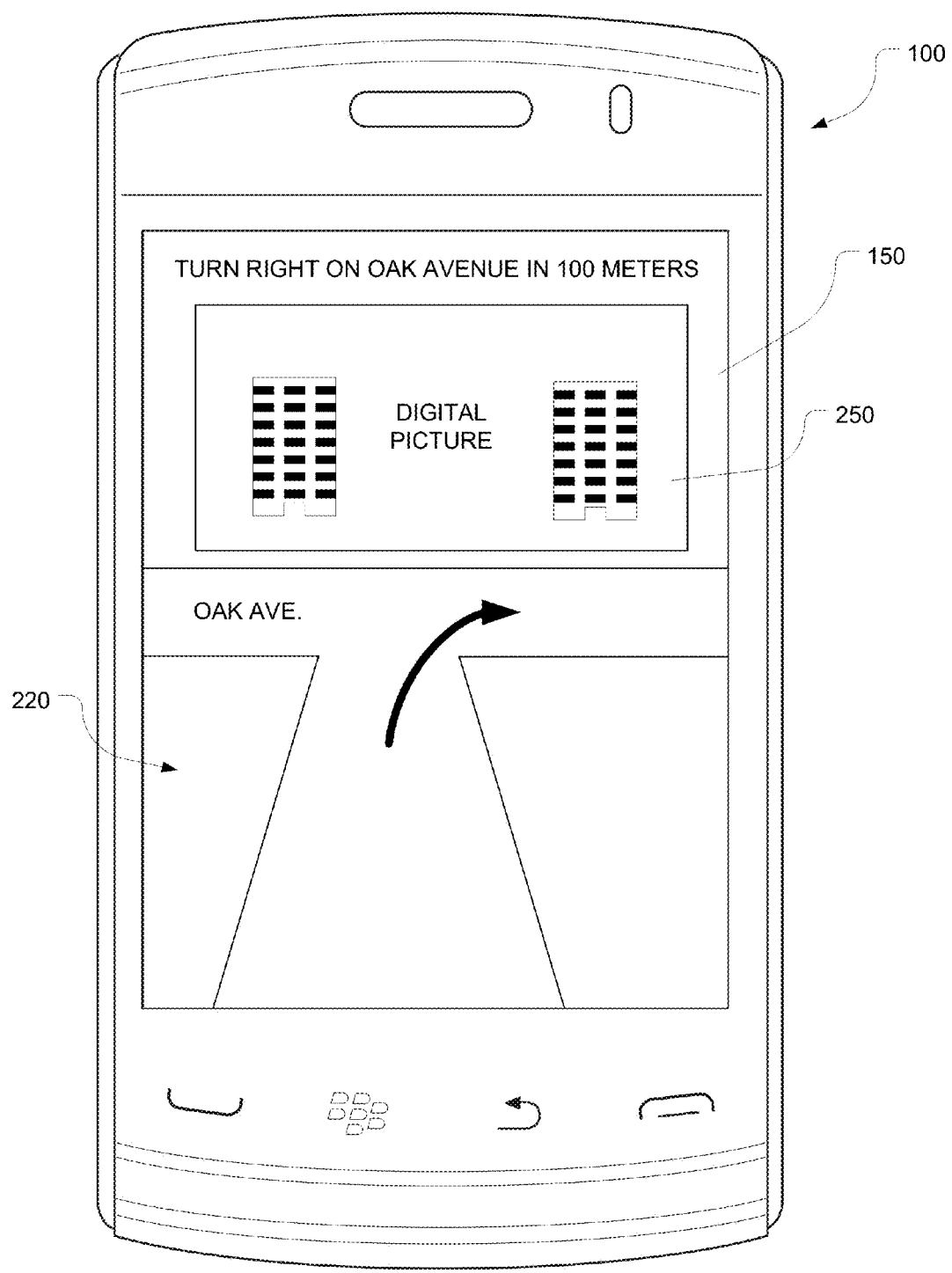
FIG. 6 depicts a navigation application presenting a perspective view of the route and a time-specific and weather-specific digital picture as a backdrop image.

FIG. 6 depicts another example of a navigation application that displays a single time-specific and weather-specific digital photograph 250 as a navigational aid. In this example, a single photograph 250 is displayed as a backdrop in a perspective-type navigation map (e.g. a three-dimensional view). The digital picture 250 is obtained from a database that contains a plurality of images for the same POI, intersection or locale (e.g. for different times of days, seasons, weather conditions, lighting conditions, etc). This provides the user with an accurate portrayal of what he or she will actually see at that intersection under the current weather and lighting conditions.

The foregoing technology furthermore enables novel navigation methods. These methods, performed by a computing device such as a mobile device, entail the device determining whether a driver's vision is likely to be impaired by a sun's position in relation to a route to be traveled and, if that is the case, whether there is predicted to be any cloud cover, fog, or other such weather conditions that would shield the driver from the sun.

Figure 7:
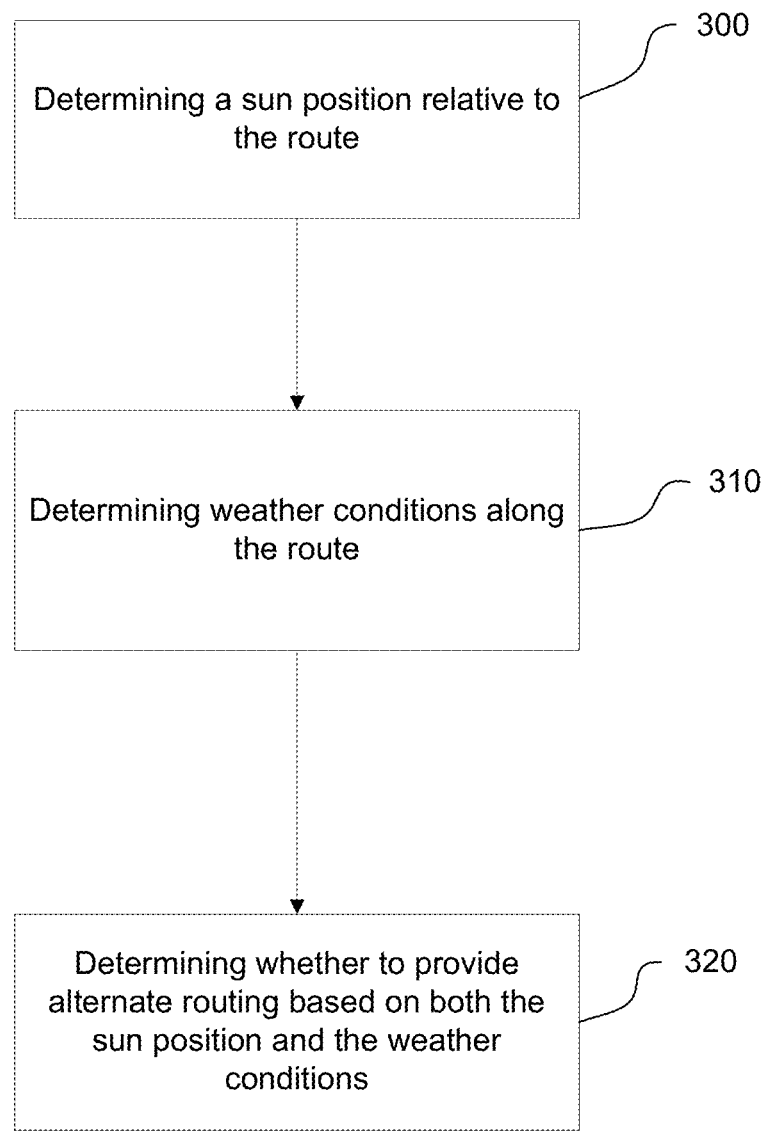
FIG. 7 is a flowchart depicting a method of providing a route in accordance with one implementation of the present technology.

FIG. 7 depicts a general method in accordance with the present technology. This general method enables a computing device to determine a route by determining (at step 300) a sun position relative to the route, determining (at step 310) weather conditions along the route, and determining (at step 320) whether to provide alternate routing based on both the sun position and the weather conditions.

Figure 8:
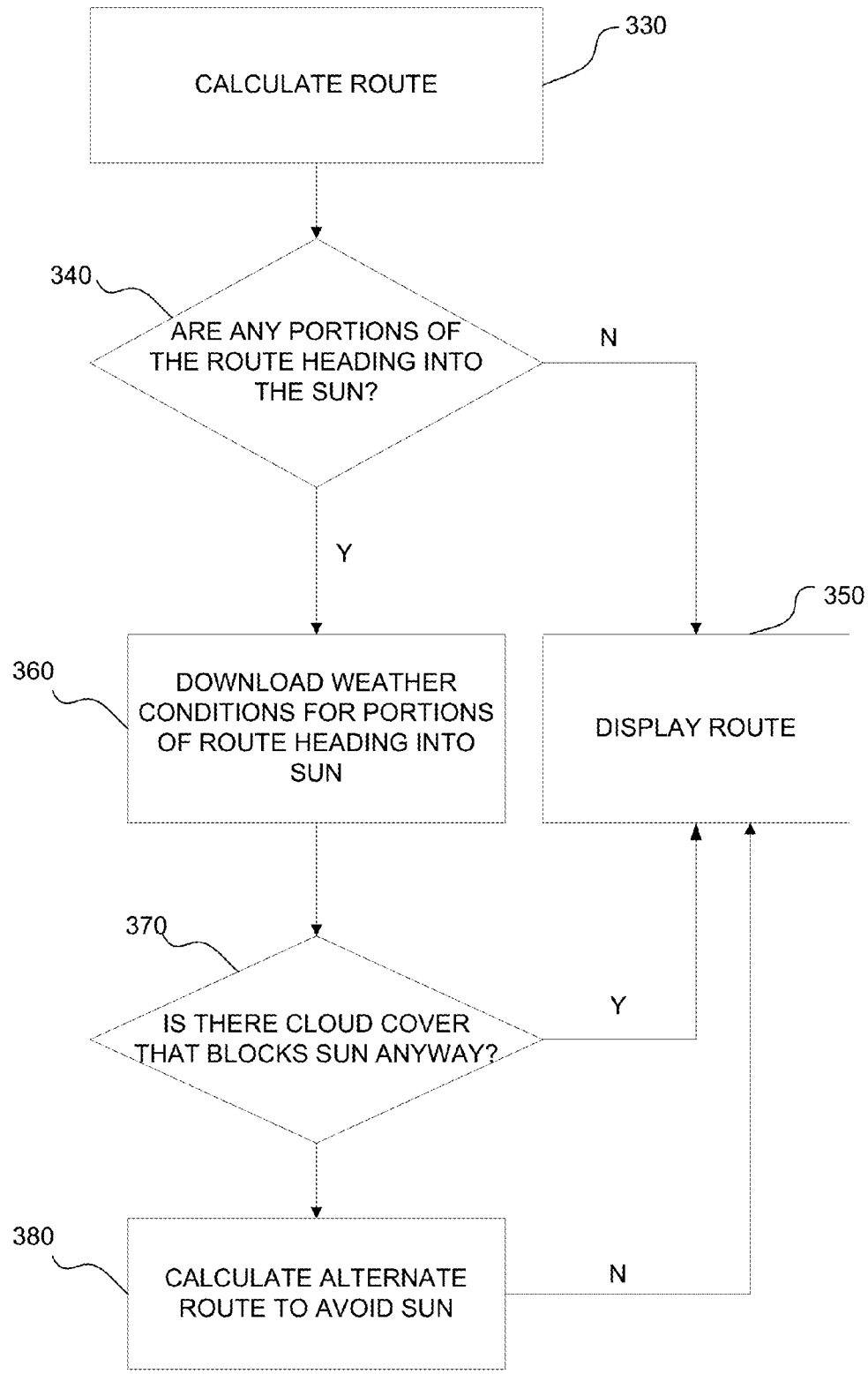
FIG. 8 is a flowchart depicting a specific method for determining a route performed by the computing device in accordance with one implementation of the present technology.

FIG. 8 depicts one specific method, presented solely by way of example, for determining the route. The specific method commences with a route calculation (at step 330). This route calculation is triggered by user input specifying a destination location. The route to the destination location is calculated and displayed on a map on the display of the device. Visual and audible directions may be provided to guide the user (driver) toward the destination location. A decision is made (at step 340) as to whether there are any portions of the route that are heading directly into the sun. This entails obtaining sun position data from the sun position database at sun data server 200 (also referred to as the sun table server) such as the one shown by way of example in FIG. 1. Alternatively, the device may store this sun data locally or may have pre-cached the data, e.g. at the beginning of each day or pre-emptively whenever the navigation system is launched. If the decision is No (there is no sun-road alignment), then the device displays the route (at step 350) that has been calculated (the originally calculated route). If the decision is Yes (there is at least some sun-road alignment), weather condition data is downloaded by the device (at step 360). Downloading of weather condition data at step 360 may be accomplished by sending a request to the weather server 210 shown by way of example in FIG. 1. Once the weather conditions are determined for the route, and more particularly for portions of the route that align with the rising or setting sun, then a determination is made as to whether any route-sun aligned portions will be in areas that are sunny (clear skies) or cloudy (overcast skies). If there is cloud cover predicted for a portion of the route that aligns with the rising or setting sun, then a decision is made (at step 370) as to whether the cloud cover is sufficient to block the sun. (Weather data may provide an index, type or level of cloud cover to provide a more nuanced determination as to whether the route is to be avoided or not.) If the decision is Yes (there is cloud cover), then the originally calculated route is displayed at step 350. If the decision is No (there is no cloud cover), then the route is re-calculated at step 380. An alternate route is thus determined that will avoid the sun. This alternate route is then displayed at step 350. Visual and/or audible directions are then provided.

Figure 9:
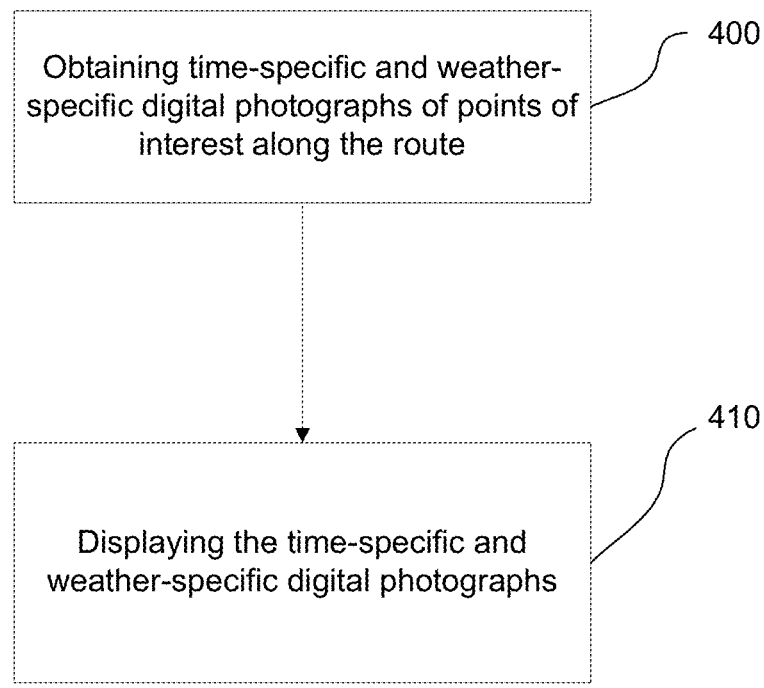
FIG. 9 is a flowchart depicting a further method performed by the computing device of presenting time-specific and weather-specific digital pictures along the route in accordance with another implementation of the present technology.

FIG. 9 depicts a related method that may be used in conjunction with the above technology. Time-specific and weather-specific digital photographs of points of interest (POI's) along the route may be obtained at step 400. These time-specific and weather-specific digital photographs of POI's may then be displayed (at step 410) at specific locations along the route corresponding to the locations of the points of interest. Obtaining the time-specific and weather-specific digital photographs may be accomplished by downloading the time-specific and weather-specific digital photographs from a POI picture database or by caching these locally in a memory of the device. Downloading of time-specific and weather-specific digital photographs for POI's along a route may be triggered when the route is calculated or at any other time, such as, for example, a predetermined distance or time before reaching each successive POI. A time-specific and weather-specific digital photograph database accessible by the device will contain a plurality of photographs of each POI taken from different angles at different times of day and night in different weather conditions, at different times of the year (different seasons). The device will request a photograph by sending a request indicating the current position, heading, date and time as well as current weather conditions. From this request, the most appropriate photograph is downloaded and displayed. For example, the device may be predicting that it will pass beside the next POI in the early morning sunlight. As such, the device will request a daytime photograph taken in the early morning light in sunny conditions at a time of year that corresponds to the present date. The time-specific and weather-specific digital photographs thus portray the POI in the most realistic manner possible, i.e. in a manner that reflects what the user would actually see from that perspective in the present lighting conditions that are actually prevailing at that time. For example, if the user drives by a POI on a snowy night, a photograph of the POI at night in the snow is displayed. If the user drives by the same POI in a clear, sunny morning from a different angle, a daytime (sunshine) photograph from a different angle is downloaded and presented.

In one implementation, the photographs are downloaded over the air a predetermined time or distance before reaching the POI to ensure that the photograph is accurate. For example, the device may download the photograph of the POI only 1 minute before the expected arrival at the POI or 1 km ahead of the POI. The device may pre-determine the file size of the photo to download and make an assessment based on current bandwidth and wireless network performance to download the photograph so that the photograph is obtained in time. For example, the device may determine that it will take 30 seconds to download a 2 MB file and then 2 seconds to render onscreen. In this example, the device will then download the file exactly 32 seconds before reaching the POI. In other implementations, the photos are downloaded ahead of arrival. Time-specific and weather-specific digital photographs that have been downloaded by the device may be buffered in local memory for a predetermined period of time or until the device has strayed a minimal distance away from the POI, at which time the photograph may be purged from memory. This will enable the device to re-use cached or buffered photographs when the device remains for a while in the vicinity of a given POI.

It should be appreciated that point of interest (POI) means any location for which photographs exist. Points of interest are thus not merely landmarks but any photograph providing a street view along the route.

When the driver stops and the navigation application is stopped or suspended, the device in one embodiment will update the photographs. Thus, if the driver stops for dinner and night falls, the daytime POI images in the memory of the device become stale. The device updates these photos by sending a request to the time-specific and weather-specific photograph database to obtain night photos of the same POI. Likewise, while the device is inoperative or navigation suspended or paused, the device may obtain new photos if the weather changes. Again, if the user is stopped for dinner and the weather changes to snow, then the device will update the photos in the memory by sending a request to the picture database and obtaining new photos that are weather-specific, i.e. showing the POI in a snowfall. This dynamic updating of photos in the memory of the device may be performed when the navigation function or navigation application is suspended or resumed, or when the device detects that is moving above a certain threshold velocity, or when it has remained at a location for a predetermined amount of time and then departs from that location. As will be appreciated, many different conditions may be defined to trigger the updating of POI photos on the device.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for a computing device to determine a route, the method comprising:
    determining a sun position relative to the route based on a current position of the computing device, a current date, and a time of day to determine whether visibility would be impaired by a rising or setting sun substantially aligned with at least a portion of the route;
    determining weather conditions along the route;
    determining cloud conditions, based on weather conditions, including whether clouds would mitigate a visibility-impairing effect of the rising or setting sun substantially aligned with the at least a portion of the route;
    determining using a processor whether to provide alternate routing based on both the sun position and the cloud conditions; and
    displaying, on the computing device, a weather-specific digital photograph of a point of interest along the route, the photograph being determined based on the determined weather conditions along the route.

2. The method as claimed in claim 1 further comprising:
    receiving a weather update while traveling along the route;
    re-determining the cloud conditions based on the weather update; and
    re-determining whether to provide alternate routing based on the re-determined cloud conditions.

3. The method as claimed in claim 1 further comprising:
    re-calculating an alternate route; and
    providing an indication that the alternate route is being adopted.

4. The method as claimed in claim 3 further comprising:
    receiving user input; and
    overriding the alternate route in response to user input.

5. The method as claimed in claim 1 further comprising:
obtaining time-specific digital photographs of points of interest along the route; and
displaying the time-specific digital photographs.

6. The method as claimed in claim 5 wherein obtaining the time-specific and weather-specific digital photographs of points of interest along the route comprises predicting a time of day and the weather conditions at locations along the route and downloading the time-specific and weather-specific digital photographs of points of interest for the locations along the route.

7. A non-transitory computer-readable medium comprising instructions in code which when loaded into a memory and executed by a processor of a computing device cause the computing device to:
determine a sun position relative to the route based on a: current position of the computing device, a current date, and a time of day to determine whether visibility would be impaired by a rising or setting sun substantially aligned with at least a portion of the route;
determine weather conditions along the route;
determine cloud conditions, based on the weather conditions, including whether clouds would mitigate a visibility-impairing effect of the rising or setting sun substantially aligned with the at least a portion of the route;
determine whether to provide alternate routing based on both the sun position and the cloud conditions; and
display, on the computing device, a weather-specific digital photograph of a point of interest along the route, the photograph being determined based on the determined weather conditions along the route.

8. The computer-readable medium as claimed in claim 7 further comprising code that causes the device to:
receive a weather update while traveling along the route;
re-determine the cloud conditions based on the weather update; and
re-determine whether to provide alternate routing based on the re-determined cloud conditions.

9. The computer-readable medium as claimed in claim 7 further comprising code that causes the device to:
re-calculate an alternate route; and
provide an indication that the alternate route is being adopted.

10. The computer-readable medium as claimed in claim 9 further comprising code that causes the device to:
override the alternate route in response to user input.

11. The computer-readable medium as claimed in claim 7 further comprising code that causes the device to:
obtain time-specific digital photographs of points of interest along the route; and
display the time-specific digital photographs.

12. The computer-readable medium as claimed in claim 11 wherein the code that causes the device to obtain the time-specific and weather-specific digital photographs of points of interest along the route comprises code for predicting a time of day and the weather conditions at locations along the route and for causing the device to download the time-specific and weather-specific digital photographs of points of interest for the locations along the route.

13. A computing device comprising:
a position-determining subsystem for determining a current position of the computing device;
a user input device for receiving a destination location;
a processor operatively coupled to a memory to execute a navigation application for determining a route to the destination location in response to user input received via the user input device, the navigation application determining a sun position relative to the route based on the current position, a current date and a time of day to determine whether visibility would be impaired by a rising or setting sun substantially aligned with at least a portion of the route, the navigation application further determining cloud conditions based on weather conditions, including whether clouds would mitigate a visibility-impairing effect of the rising or setting sun substantially aligned with the at least a portion of the route;
a radiofrequency transceiver for obtaining the weather conditions; and
a display for displaying a weather-specific digital photograph of a point of interest along the route, the photograph being determined based on the obtained weather conditions along the route,
wherein the navigation application executed by the processor determines whether i to provide alternate routing based on both the sun position and the cloud conditions.

14. The computing device as claimed in claim 13 wherein the radiofrequency transceiver receives a weather update while traveling along the route and wherein the navigation application, in response to receiving the weather update, re-determines the cloud conditions based on the weather update and re-determines whether to provide alternate routing based on the re-determined cloud conditions.

15. The computing device as claimed in claim 13 wherein the navigation application is programmed to re-calculate an alternate route and to cause a user output device to provide an indication that the alternate route is being adopted.

16. The computing device as claimed in claim 13 wherein the navigation application is programmed to override the alternate route in response to user input received via the user input device.

17. The computing device as claimed in claim 13 wherein the navigation application is programmed to instruct the radiofrequency transceiver to obtain time-specific digital photographs of points of interest along the route and to cause the display to display the time-specific digital photographs.

18. The computing device as claimed in claim 17 wherein the navigation application is further programmed to predict a time of day and the weather conditions at locations along the route and to cause the radiofrequency transceiver to download the time-specific and weather-specific digital photographs of points of interest for the locations along the route.

* * * * *

UNITED STATES PATENT AND TRADEMARK OFFICE
CERTIFICATE OF CORRECTION

PATENT NO. : 9,279,693 B2
APPLICATION NO. : 13/399005
DATED : March 8, 2016
INVENTOR(S) : James Allen Hymel and William Donald Santo It is certified that error appears in the above-identified patent and that said Letters Patent is hereby corrected as shown below:

Claims
Column 12, line 28, in claim 13, please delete "i" between "whether" and "to"

Signed and Sealed this
Nineteenth Day of July, 2016

Michelle K. Lee
*Director of the United States Patent and Trademark Office*